US012774225B2

(12) United States Patent
Shibata et al.

(10) Patent No.: US 12,774,225 B2
(45) Date of Patent: Oct. 27, 2026

(54) FINE BUBBLE GENERATOR AND WATER TREATMENT DEVICE

(71) Applicant: SHIBATA CORPORATION, Aichi (JP)

(72) Inventors: Yoshiki Shibata, Aichi (JP); Kouji Hanamura, Aichi (JP)

(73) Assignee: Shibata Corporation, Aichi (JP)

( * ) Notice: Subject to any disclaimer, the term of this patent is extended or adjusted under 35 U.S.C. 154(b) by 751 days.

(21) Appl. No.: 17/606,383

(22) PCT Filed: Jul. 22, 2020

(86) PCT No.: PCT/JP2020/028588
§ 371 (c)(1),
(2) Date: Oct. 25, 2021

(87) PCT Pub. No.: WO2021/020310
PCT Pub. Date: Feb. 4, 2021

(65) Prior Publication Data

US 2022/0242754 A1 Aug. 4, 2022

(30) Foreign Application Priority Data

Jul. 26, 2019 (JP) ................................ 2019-137478

(51) Int. Cl.
*C02F 1/34* (2023.01)
*C02F 1/20* (2023.01)

(52) U.S. Cl.
CPC .................. *C02F 1/34* (2013.01); *C02F 1/20* (2013.01); *C02F 2201/002* (2013.01); *C02F 2209/03* (2013.01)

(58) Field of Classification Search
CPC .... B01F 23/2375; B01F 25/4335; C02F 1/20; C02F 1/34; C02F 2201/002; C02F 2209/03; C02F 2303/26
See application file for complete search history.

(56) References Cited

U.S. PATENT DOCUMENTS 6,042,089 A 3/2000 Klein
9,016,928 B1 4/2015 England et al.
(Continued)

FOREIGN PATENT DOCUMENTS

CN 201283275 Y 8/2009
CN 107530650 A 1/2018
(Continued)

OTHER PUBLICATIONS

Office action dated Jan. 19, 2023 in related Korean application 10-2021-7036113.

(Continued)

*Primary Examiner* — Dirk R Bass
(74) *Attorney, Agent, or Firm* — Polson Intellectual Property Law P.C.; Margaret Polson; Christopher Sylvain

(57) ABSTRACT

In a fine bubble generator having a structure in which a columnar portion protrudes from an orifice of a tubular member, the presence of the columnar portion inhibits a flow of a fluid, so that a flow rate of the fluid that generates fine bubbles is limited. In addition, foreign matter may be sandwiched between the columnar portions. It takes time and effort to manufacture the columnar portions. Furthermore, when the columnar portion is supported in a cantilever state, it is difficult to ensure mechanical rigidity and also to ensure durability.

A fine bubble generator includes: an inlet portion that gradually reduces in diameter from an inlet of a tubular body; an orifice continuous to the inlet portion; and an enlarged-diameter portion continuous to the orifice, and the inlet portion, the orifice and the enlarged-diameter portion are sequentially formed. A boundary between the orifice and the enlarged-diameter portion is a radially elevation surface, and a diameter of the enlarged-diameter portion is 3 to 10
(Continued)

times a diameter of the orifice. A concave portion is preferably formed in an outlet peripheral wall.

14 Claims, 10 Drawing Sheets

(56) References Cited

U.S. PATENT DOCUMENTS

| | | | | |
|---|---|---|---|---|
| 9,046,115 | B1 | 6/2015 | England et al. | |
| 2007/0045198 | A1 | 3/2007 | Sugiura | |
| 2011/0003370 | A1 | 1/2011 | Gordon et al. | |
| 2019/0176100 | A1* | 6/2019 | Shibata | B01F 23/2323 |
| 2020/0038815 | A1* | 2/2020 | Tian | B01F 27/111 |

FOREIGN PATENT DOCUMENTS

| | | | | |
|---|---|---|---|---|
| CN | 108704499 | A * | 10/2018 | B01F 3/04099 |
| IN | 109475829 | A | 3/2019 | |
| JP | 08-131800 | A | 5/1996 | |
| JP | 11-014035 | A | 1/1999 | |
| JP | 2000-176266 | A | 6/2000 | |
| JP | 2008-018330 | A | 1/2008 | |
| JP | 2008161826 | A | 7/2008 | |
| JP | 2008-296096 | A | 12/2008 | |
| JP | 2008-307509 | A | 12/2008 | |
| JP | 2008290050 | A | 12/2008 | |
| JP | 2009136864 | A | 6/2009 | |
| JP | 4415794 | B2 | 2/2010 | |
| JP | 2011083772 | A | 4/2011 | |
| JP | 4706664 | | 6/2011 | |
| JP | 2013146714 | A | 8/2013 | |
| JP | 5712292 | B2 | 7/2015 | |
| JP | 6077627 | B1 | 8/2017 | |
| JP | 2017136590 | A | 8/2017 | |
| JP | 2018-51561 | A | 4/2018 | |
| JP | 2018021330 | A1 | 7/2018 | |
| KR | 1020150037258 | | 4/2015 | |
| KR | 10-2015-0114716 | A | 10/2015 | |
| KR | 10-2018-020701 | A1 | 10/2018 | |
| KR | 1020190031012 | | 3/2019 | |
| WO | 2008139728 | A1 | 11/2008 | |
| WO | 2018/020701 | A1 | 2/2018 | |

OTHER PUBLICATIONS

Office action dated Jan. 5, 2023 in related Chinese application 2020800335572.3.

International Search Report dated Feb. 4, 2021 in parent International application PCT/JP2020/028588.

International Preliminary Report on Patentability, Ch. II dated Jun. 11, 2021 in parent International application PCT/JP2020/028588.

U.S. Appl. No. 16/301,890, filed Nov. 15, 2018, applicant Shibata Corporation.

U.S. Appl. No. 17/363,686, applicant Shibata Corporation.

Extended European Search Report dated Aug. 30, 2023 in related European application No. 20845663.2.

Office Action dated Jul. 15, 2026 in related Korean application 10-2025-7005736.

* cited by examiner

| | | | | | | | | | | | | | | | |
|---|---|---|---|---|---|---|---|---|---|---|---|---|---|---|---|
| 1 | 20.000 | 130266115 | 4 | 14 | 4.080 | 130265738 | 65 | 27 | 0.832 | 130112134 | 68455 | 40 | 0.170 | 119320496 | 7605141 |
| 2 | 17.688 | 130266111 | 4 | 15 | 3.611 | 130265672 | 72 | 28 | 0.737 | 130043679 | 78204 | 41 | 0.150 | 111715355 | 10876651 |
| 3 | 15.661 | 130266107 | 5 | 16 | 3.195 | 130265600 | 533 | 29 | 0.652 | 129967475 | 113727 | 42 | 0.133 | 101838704 | 14919077 |
| 4 | 13.859 | 130266102 | 6 | 17 | 2.827 | 130265067 | 593 | 30 | 0.577 | 129853748 | 128859 | 43 | 0.118 | 86120627 | 19551103 |
| 5 | 12.264 | 130266095 | 10 | 18 | 2.502 | 130264474 | 1170 | 31 | 0.510 | 129724889 | 189464 | 44 | 0.104 | 66529523 | 22300288 |
| 6 | 10.852 | 130266085 | 20 | 19 | 2.214 | 130263303 | 1463 | 32 | 0.452 | 129535426 | 202635 | 45 | 0.092 | 44229235 | 22376653 |
| 7 | 9.603 | 130266065 | 40 | 20 | 1.959 | 130261840 | 3111 | 33 | 0.400 | 129332790 | 496279 | 46 | 0.082 | 21850303 | 12758481 |
| 8 | 8.498 | 130266025 | 50 | 21 | 1.734 | 130258729 | 4807 | 34 | 0.354 | 128836511 | 504228 | 47 | 0.072 | 9081821 | 7678502 |
| 9 | 7.520 | 130265974 | 63 | 22 | 1.534 | 130253922 | 9387 | 35 | 0.313 | 128332284 | 415702 | 48 | 0.064 | 1312319 | 1066844 |
| 10 | 6.654 | 130265911 | 52 | 23 | 1.358 | 130244535 | 13866 | 36 | 0.277 | 127916579 | 555232 | 49 | 0.057 | 145476 | 145476 |
| 11 | 5.888 | 130265859 | 43 | 24 | 1.201 | 130230669 | 21069 | 37 | 0.245 | 127361347 | 1082194 | 50 | 0.050 | 0 | 0 |
| 12 | 5.211 | 130265816 | 40 | 25 | 1.063 | 130209600 | 39252 | 38 | 0.217 | 126279153 | 2239603 | 51 | 0.001 | 0 | 0 |
| 13 | 4.611 | 130265776 | 38 | 26 | 0.941 | 130170348 | 58114 | 39 | 0.192 | 124039550 | 4719094 | | | | |

FINE BUBBLE GENERATOR AND WATER TREATMENT DEVICE

TECHNICAL FIELD

The present invention relates to a fine bubble generator and a water treatment device.

BACKGROUND ART

As one method for forming fine bubbles, a cavitation effect is used. Patent Literatures 1 and 2 disclose a fine bubble generator in which a columnar portion protrudes into an orifice of a tubular body portion and nano-order fine bubbles are generated in a water stream passing through the orifice.

When tap water is introduced into the fine bubble generator, the water stream is narrowed by a throttle portion formed between opposing columns, and a flow rate thereof increases. As a result, a negative pressure area is formed in the throttle portion (and a downstream side thereof) according to the principle of Bernoulli, and dissolved gas in water is precipitated by a cavitation (pressure reduction) effect thereof, so that fine bubbles are generated.

In the case of a micro-order fine bubble, a small diameter portion (orifice) may be simply provided in a tubular member (Patent Literature 3). That is, micro-order fine bubbles can be formed by a device including an inlet portion whose inner diameter gradually decreases from an inlet-side end portion toward a central portion of the tubular member, an orifice connected to the inlet portion, and an enlarged-diameter portion connected to the orifice and whose inner diameter gradually increases toward an outlet-side other end of the tubular member.

CITATIONS LIST

Patent Literature

Patent Literature 1: JP 5712292 B
Patent Literature 2: JP 6279179 B
Patent Literature 3: JP 6369879 B

SUMMARY OF INVENTION

Technical Problems

In order to generate nano-order fine bubbles, the columnar portion protrudes from the orifice of the tubular member.

Since the presence of the columnar portion inhibits a flow of a fluid, a flow rate of the fluid that generates fine bubbles is limited. In addition, foreign matter may be sandwiched between the columnar portions.

In addition, it takes time and effort to manufacture the columnar portions. Furthermore, when the columnar portion is supported in a cantilever state, it is difficult to ensure mechanical rigidity and also to ensure durability.

Solutions to Problems

The present invention has been made to achieve the above problems, and is defined as follows. That is, a tubular fine bubble generator having an orifice, wherein a concave portion is formed in a peripheral wall of an outlet of the orifice.

Here, the orifice refers to a portion that is reduced in diameter and has a predetermined length in a tubular member.

In other words, in the tubular member, an inlet portion and an outlet portion (enlarged-diameter portion) having a larger diameter than that of the orifice are continuous to an inlet side and an outlet side of the orifice, respectively.

The orifice preferably includes a flat inner peripheral surface of the same diameter in order to stabilize a flow. A diameter of the orifice can be arbitrarily designed in the relationship between a compression ratio (with respect to a fluid) to be determined and an amount of the fluid to be treated. In order to exert a cavity effect, it is important to adjust a difference in diameter between an orifice outlet and the enlarged-diameter portion leading to the orifice outlet.

A length of the orifice can be arbitrarily designed as long as the fluid flowing through the orifice is stable, that is, the flow is aligned in an axial direction thereof.

Of course, the diameter of the orifice is not limited to a diameter uniform in the axial direction thereof. The diameter of the orifice can be sequentially changed, and a spiral groove can be formed in the inner peripheral surface of the orifice.

Preferably, the inlet portion leading to the orifice sequentially reduces in diameter toward the orifice. This is to smoothly introduce the fluid into the orifice. This makes it possible to sufficiently compress the fluid while ensuring a high flow rate.

A degree of diameter reduction (inclination angle with respect to the axial direction) can be arbitrarily selected according to the type of fluid, the flow rate, and the compression rate to be determined.

The inner peripheral surface of the inlet portion is preferably a flat surface, but a spiral groove or the like can also be provided in an inside thereof.

The enlarged-diameter portion leading to the orifice outlet is larger in diameter than the orifice outlet. As a result, when the fluid compressed by the orifice is discharged to the enlarged-diameter portion, the fluid bursts to generate a negative pressure, so that a cavity effect is exerted.

A difference (ratio) between the diameter of the outlet of the orifice and a maximum diameter of the enlarged-diameter portion is arbitrarily designed according to an average particle size, a number of particles, and the like of fine bubbles to be determined.

It is widely known that micro-order fine bubbles are formed by releasing the fluid compressed by the orifice at the enlarged-diameter portion to generate a negative pressure (see Patent Literature 3).

In the present invention, by providing the concave portion in the peripheral wall of the outlet of the orifice, the fine bubbles to be formed can be made nano-order without providing any column portion in the orifice.

Since the column portion can be omitted, resistance in the orifice is reduced, so that the amount of fluid that can be treated is increased. In addition, since the structure is simplified, the fine bubble generator is easily manufactured, and durability and maintainability are improved.

This concave portions are preferably evenly distributed in a circumferential direction and a radial direction about a center of the orifice in the peripheral wall of the outlet of the orifice. This is to stably form fine bubbles.

The peripheral wall of the outlet of the orifice is preferably formed in a direction perpendicular to an axis of the orifice, and a depth direction of the concave portion formed therein is preferably in the same direction as the axis of the orifice. The concave portion has the same diameter in the depth direction or reduces in diameter in the depth direction from a portion opened to the peripheral wall. This is to prevent the fluid from staying in the concave portion. From the viewpoint of moldability (ease of die cutting), it is preferable to form the concave portion as described above.

Any shape of the concave portion may be employed. For example, the concave portion can be drilled away from or closer to the orifice as the concave portion becomes deeper.

Preferably, a distance from an outlet peripheral edge of the orifice to a peripheral edge of the concave portion (a gap therebetween) is shorter. However, if they are too close, a wall thickness of the outlet peripheral edge becomes too thin, so that mechanical strength cannot be secured. According to the present inventors' study, when the fine bubble generator is made of resin, the distance between them is set to 0.1 mm or more.

From the viewpoint of bringing the outlet peripheral edge of the orifice close to the peripheral edge of the concave portion, the peripheral wall of the outlet of the orifice is preferably in a direction perpendicular to a central axis of the orifice.

According to the present inventors' study, it has been found that a large negative pressure is generated in the concave portion. As a result of simulation, a negative pressure of 1/10 to 1/100 is generated, as compared with that at a center of the enlarged-diameter portion. The negative pressure in the concave portion periodically changes due to an interaction with water stream.

As the negative pressure in the concave portion increases, a greater cavity effect is produced therein. In addition, it is considered that the periodic change of the negative pressure produces the same effect as that produced by applying an ultrasonic wave to the fluid.

The nano-ordering of fine bubbles due to the presence of the concave portion is considered to be an interaction between a large negative pressure in the concave portion and the periodic change thereof.

It is considered that the average particle size and particle size distribution of the fine bubbles generated in the fluid can be controlled by controlling a value of the negative pressure and the frequency of the change thereof.

Parameters for controlling the value of the negative pressure in the concave portion and the frequency of the change thereof are, for example, as follows:

Ratio between outlet diameter of orifice and diameter of enlarged-diameter portion Aspect ratio of concave portion (ratio between area and depth of opening)

Speed of fluid discharged from outlet of orifice and viscosity thereof

Area ratio of concave portion to peripheral wall of orifice

Distance between outlet peripheral edge of orifice and peripheral edge of concave portion Ratio between outlet area of orifice and area of concave portion, etc.

The orifice is not particularly limited as long as the orifice has a shape that narrows and compresses the water stream sent from the inlet and accelerates the flow rate thereof, but is preferably provided with a space having a circular cross section, from the viewpoint of minimizing resistance to the water stream.

The diameter of the orifice can be arbitrarily selected according to the amount of water to be treated and the like.

In order to obtain such a flow rate, the flow rate and the pressure of the fluid and the textures (material and surface roughness) of the inner peripheral surface of the orifice are adjusted. In order to stabilize the flow rate, the orifice is preferably provided with a portion (straight pipe portion) having the same diameter. A length of the straight pipe portion is preferably 0.5 to 2.0 times, more preferably 1.0 to 1.5 times a length of the outlet diameter of the orifice.

A large-diameter portion is formed on a downstream side of the orifice, and water passing through the orifice is released to the large-diameter portion. As a result, the water stream compressed by the orifice is released and the pressure thereof decreases. Air bubbles are formed due to the cavity effect as a result of the pressure reduction.

The enlarged-diameter portion leading to the outlet of the orifice is preferably circular in cross section, and its central portion coincides with the center of the orifice. As a result, the fluid discharged from the outlet of the orifice is uniformly diffused and reduced in pressure. Therefore, fine bubbles are uniformly formed.

In the present invention, the peripheral wall of the outlet of the orifice is perpendicular to the axis of the orifice, so that the enlarged-diameter portion is cylindrical with a uniform diameter from the outlet peripheral edge of the orifice.

When the peripheral wall of the outlet of the orifice is a vertical wall, the fluid discharged from the outlet of the orifice can be efficiently negatively pressurized. It is also contemplated that the concave portion can be brought closer to the orifice outlet to provide a larger negative pressure and a suitable negative pressure period.

A shape of the inner peripheral surface of the enlarged-diameter portion can be arbitrarily designed, and for example, can be an inverse funnel shape in which the enlarged-diameter portion continuous to the outlet of the orifice is sequentially enlarged in diameter as it goes away from the outlet.

The pressure in the concave portion formed in the outlet peripheral wall of the orifice is set to 1/10 to 1/100 of the pressure in the central portion of the enlarged-diameter portion. Since the value of the pressure cannot be directly measured, a simulation result of simulation software (Simulation manufactured by SolidWorks Corporation) regarding the water stream is adopted. For specific simulation results, see FIG. 4.

In the concave portion having a negative pressure in this manner, a density of the fluid decreases and almost becomes a gaseous state. It is considered that fine bubbles are formed when the gaseous-state fluid in the concave portion is drawn into the liquid-state fluid. Then, the fluid flowing through the enlarged-diameter portion and the gasified fluid in the concave portion interfere with each other, and the negative pressure in the concave portion periodically changes. It is considered that the frequency of this change and the magnitude of the negative pressure in the concave portion are combined to make fine bubbles nano-order.

The peripheral wall of the enlarged-diameter portion can be provided with a second concave portion continuously or discontinuously in the circumferential direction.

Generation of fine bubbles can also be promoted in the second concave portion. A pressure in the second concave portion is larger than that in the first concave portion formed about the outlet of the orifice and smaller than that at the center of the enlarged-diameter portion.

The fluid flowing through the enlarged-diameter portion is stirred by the second concave portion in the peripheral wall of the enlarged-diameter portion. As a result, the cavity-effect in the first concave portion is promoted.

From the viewpoint of stirring, the second concave portion can be replaced with a convex portion.

The fine bubble generator of the present invention can generate a large amount of nano-order fine bubbles, once a fluid such as water is passed through the fine bubble generator. In other words, since a large negative pressure is generated in the concave portion, the fluid that has entered the concave portion has gas phase properties in the concave portion. As a result, characteristics of the fluid itself may change.

For example, it is conceivable that so-called clusters of fluid may be broken, though it cannot be measured. In other words, the smaller the clusters, the higher permeability of the fluid itself. In addition, the nano-bubble water obtained in the present invention has the same surface tension as that of normal water. On the other hand, nano-bubble water in which fine bubbles of air supplied to water are made by mechanical stirring or applying pressure from the outside has a small surface tension, and easily wets a counter substance.

As described above, in the fine bubble water manufactured by the fine bubble generator of the present invention, the water itself has novel characteristics. Therefore, in another aspect of the present invention, fine bubbles are removed from the fine bubble water obtained by the method described above. Even in the absence of fine bubbles, the water treated with the fine bubble generator of the present invention has novel characteristics. In order to remove the fine bubbles, ultrasonic waves may be applied so that nano-order fine bubbles grow in a microloader, and then the micro-ordered fine bubbles may naturally disappear.

The present invention is not limited to removing all the fine bubbles from the fine bubble water, and any part thereof may be removed.

The fine bubble water obtained by passing through the fine bubble generator of the present invention has high cleaning ability, even in an unchanged state, and other general functions of fine bubble water.

The fluid passing through the fine bubble generator is not limited to tap water. That is, any fluid may be used as long as the fluid can pass through the fine bubble generator and can generate a negative pressure without clogging the orifice or the concave portion. Not only pure water and deionized water, but also contaminated water, seawater, and the like can be used as the fluid. Furthermore, alcohol, gasoline, diesel oil, and the like can also be used as the fluid.

Such fine bubble water can also be used as a raw material of a cleaning material, an antimicrobial against viruses and bacteria, a disinfectant, a pharmaceutical material, a food material, a cosmetic material, a building material, a civil engineering agent, a fertilizer material, a solvent of an emulsion, or the like.

Similarly, water obtained by removing fine bubbles from the fine bubble water can also be used as a raw material of a cleaning agent, an antimicrobial, a disinfectant, a pharmaceutical material, a food material, a cosmetic material, a building material, a civil engineering agent, a fertilizer material, a solvent of an emulsion, or the like.

DESCRIPTION OF EMBODIMENT

Figure 1:
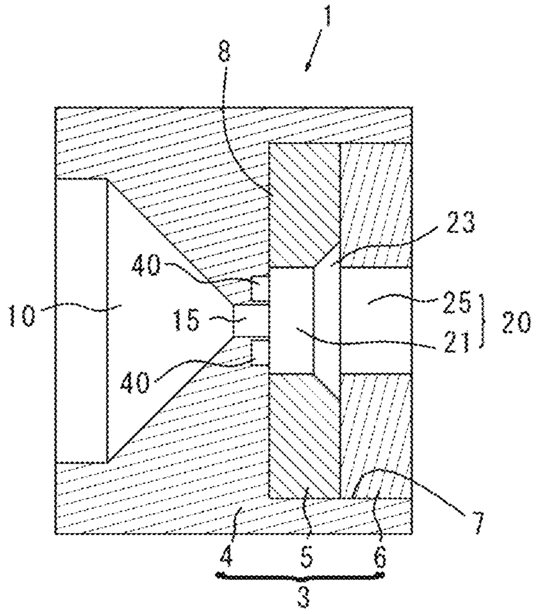
FIG. 1 is a cross-sectional view of a fine bubble generator according to an embodiment of the present invention.

FIG. 1 is a cross-sectional view illustrating a structure of a fine bubble generator 1 according to an embodiment of the present invention.

The fine bubble generator (hereinafter, sometimes simply referred to as a "generator") 1 includes an inlet portion 10, an orifice 15, an enlarged-diameter portion 20, and concave portions 40 in a tubular casing 3.

The tubular housing 3 is composed of three pieces 4, 5 and 6, and a fitting hole 7 is formed in one end side (right side in the figure) of the first piece. This fitting hole 7 has a flat bottom surface (peripheral wall 8 of an opening of the orifice 15). The second and third pieces 5 and 6 penetrate into the fitting hole 7 without a gap.

At the other end (left side in the figure) of the first piece 4, the inlet portion 10 is conically formed and connected to the orifice 15. The orifice 15 is a through hole having the same radius and opens in the fitting hole 7. The orifice 15 and the inlet portion 10 align their center lines with a center line of the first piece 4.

In the first piece 4, the first concave portions 40 are formed in a bottom surface of the fitting hole 7, that is, in the peripheral wall 8 of the outlet of the orifice 15.

Figure 2:
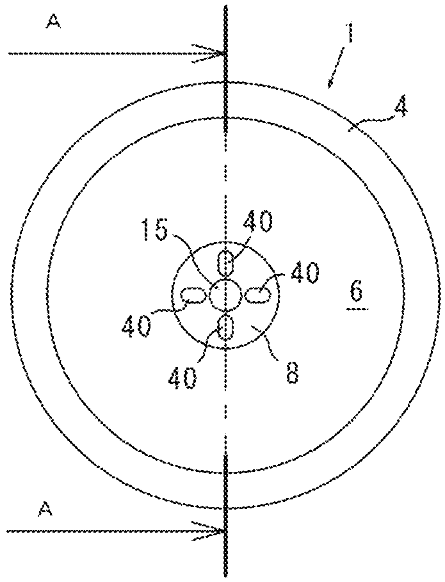
FIG. 2 is a front view of the fine bubble generator as viewed from an outlet side.

As illustrated in FIG. 2, the first concave portions 40 radially open at intervals of 90 degrees in the circumferential direction about a center of the orifice 15 in the peripheral wall 8.

In this example, the openings of the concave portions 40 each have a rectangular shape (oval coin shape) with rounded corners. The opening is formed in parallel with the orifice 15 while maintaining the shape of the opening.

The second piece 5 is a disk-shaped member fitted into the fitting hole 7, and a first enlarged-diameter portion 21 continuous to the orifice 15 is formed. A diameter of the first enlarged-diameter portion 21 is sequentially enlarged after passing through a central portion of the second piece 5 to form a second concave portion 23.

In this example, the second concave portion 23 is continuously formed in the circumferential direction of the inner peripheral surface of the second piece 5, but may be intermittent.

The disk-shaped third piece 6 is fitted into the fitting hole 7 so as to overlap the second piece 5. A second enlarged-diameter portion 25 is formed on the third piece 6, and is combined with the first enlarged-diameter portion 21 of the second piece 5 to constitute the enlarged-diameter portion 20 as the fine bubble generator 1.

In this example, the first enlarged-diameter portion 21 and the second enlarged-diameter portion 25 have the same diameter, but the diameter of the second enlarged-diameter portion 25 may be larger than that of the first enlarged-diameter portion 21.

All of the three pieces 4, 5, and 6 constituting the tubular casing 3 can be formed of synthetic resin. Of course, it can also be formed of metal or ceramics.

In the above description, all the first concave portions 40 are exposed to the first enlarged-diameter portion 21.

The first concave portions 40 may be radially expanded in the peripheral wall 8 such that, when the second piece 5 is fitted, they are partially covered with the second piece 5.

The first concave portions 40 are preferably formed radially about the center of the outlet of the orifice 15, and the formation directions are not limited to the four directions illustrated in FIG. 2. The first concave portions 40 can be arbitrarily formed in a range of, for example, 3 to 12 directions. It is preferable that each of the first concave portions 40 is evenly distributed in the circumferential direction and the radial direction when viewed from the center of the outlet of the orifice 15.

As a fine bubble generator of the example, a fine bubble generator having the following specification was prepared. The tubular casing 3 is made of ABS resin.

Tubular casing 3: diameter of 12.0 mm and length of 10 mm

Opening diameter of inlet portion: 8.0 mm

Opening angle of inclined surface of inlet portion: 90 degrees

Diameter of orifice 15: 0.9 mm

Length of orifice 15: 1.0 mm

Vertical width of first concave portion 40: 0.7 mm

Width of first concave portion 40: 0.4 mm

Depth of first concave portion 40: 0.5 mm

Distance between orifice 15 and first concave portion 40: 0.1 mm

Diameters of enlarged-diameter portions 21 and 25: 0.3 mm

Inclination angle of second concave portion 23: 90 degrees

Width of second concave portion 23: 0.75 mm

Fitting hole 7: diameter of 10 mm and depth of 4.0 mm

Thicknesses of second and third pieces: 2.0 mm

Tap water was introduced into the inlet side of the fine bubble generator 1 configured as described above at a pressure of 2.0 MPs, water discharged from the enlarged-diameter portion 20 side was collected, and the particle size distribution of fine bubbles contained therein was measured using SALD-7500H manufactured by Shimadzu Corporation.

Figure 3:
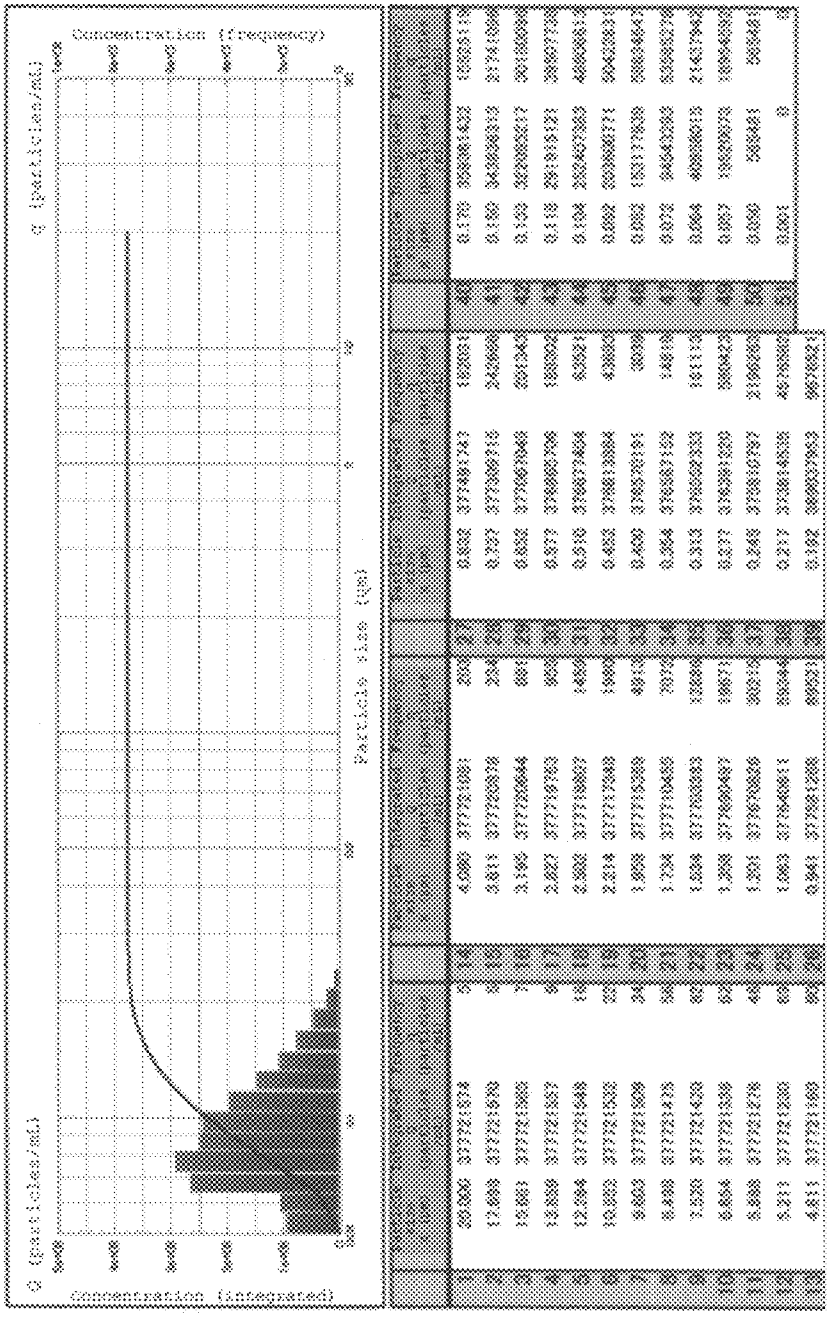
FIG. 3 is a chart illustrating measurement results of the generator of FIG. 1.

The results are illustrated in FIG. 3.

The average particle size is 93 nm, and the number of nano-order fine bubbles per ml is more than 370 million. There were few micro-order fine bubbles.

Figure 4:
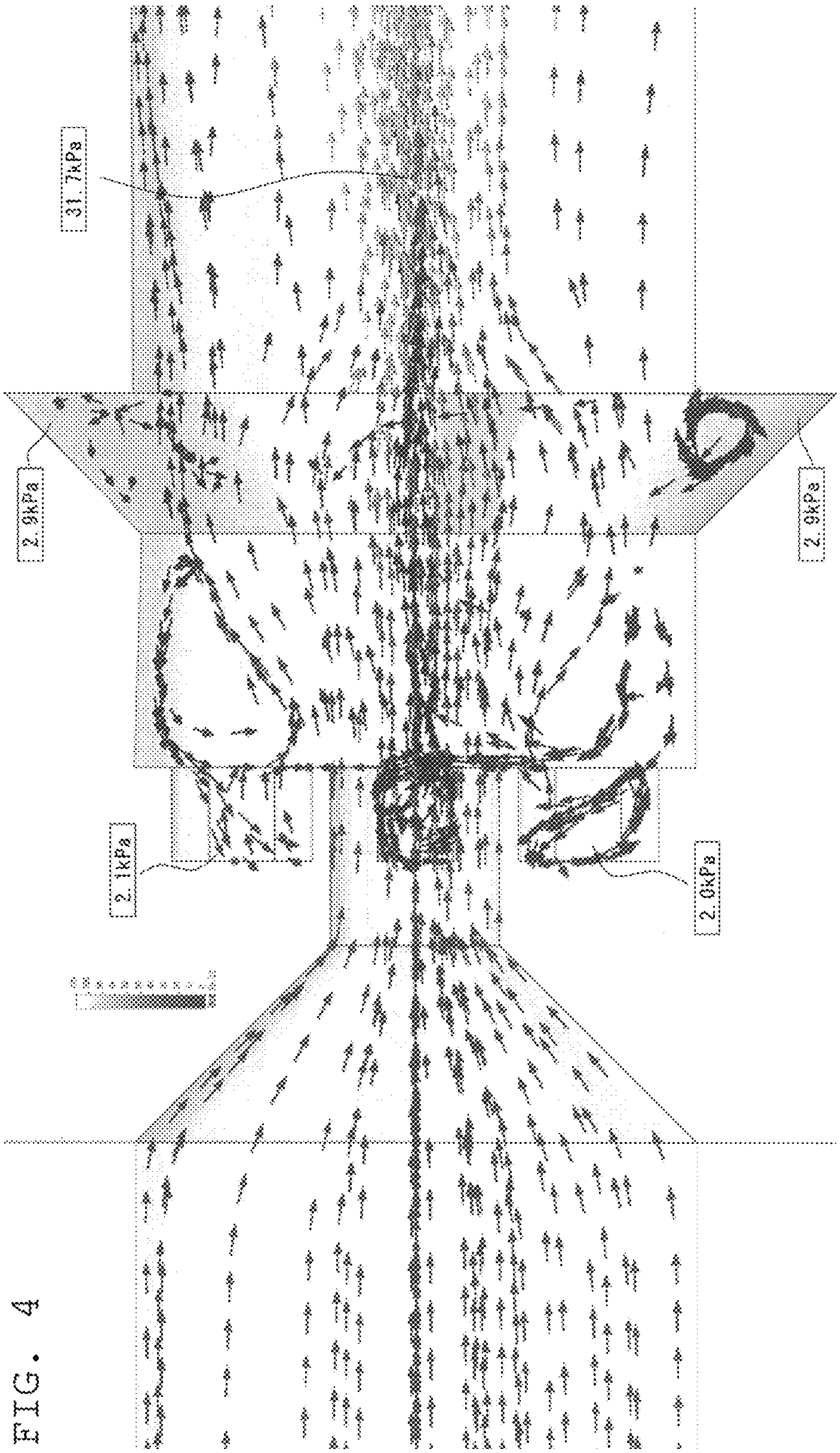
FIG. 4 illustrates simulation results of the generator.

A simulation of water stream in this example is illustrated in FIG. 4. In FIG. 4, the flow rate is indicated by color tones of an arrow. The lighter the color of the arrow, the faster the flow rate.

The pressure in the enlarged-diameter portion was 31.7 kPa, whereas the pressure in the first concave portion was 2.1 kPa and the pressure in the second concave portion was 2.9 kPa.

Next, the same test was performed on a sample (see FIG. 5) in which the second concave portion was omitted in the specification of FIG. 1.

Figure 6:
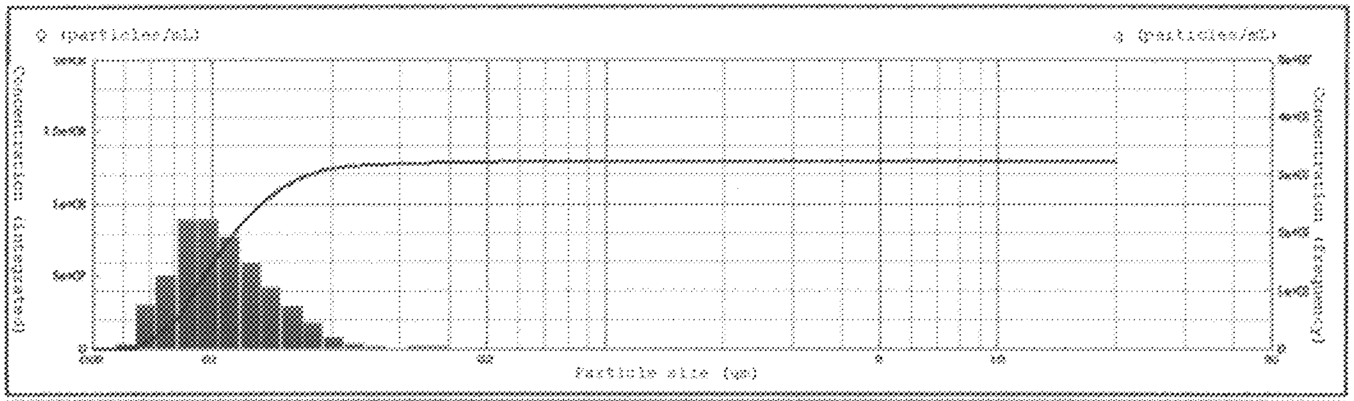
FIG. 6 is a chart illustrating measurement results of the generator of FIG. 5.

The results are illustrated in FIG. 6.

The average particle size was 109 nm, and the number of nano-order fine bubbles per ml was about 130 million.

Figure 5:
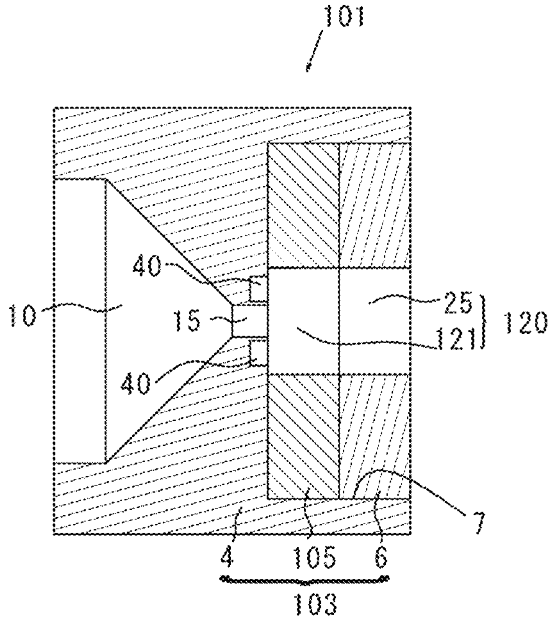
FIG. 5 is a cross-sectional view of a fine bubble generator according to another embodiment.
Figure 7:
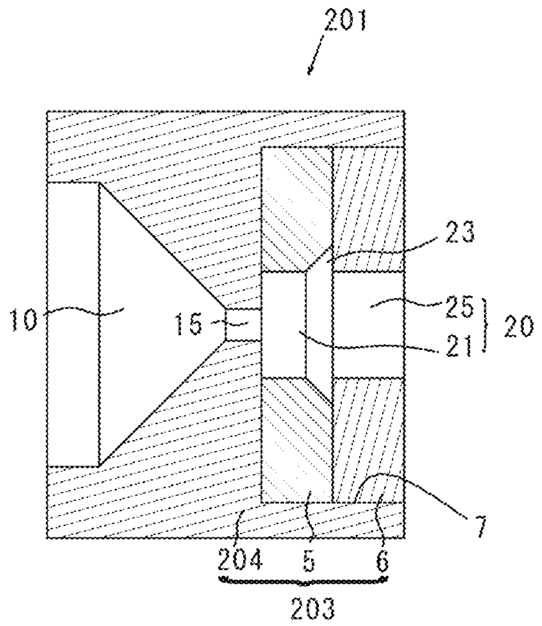
FIG. 7 is a cross-sectional view of a fine bubble generator according to another embodiment.

Next, the same test was performed on a sample in which the first concave portion was omitted in the specification of FIG. 5 (see FIG. 7).

Figure 8:
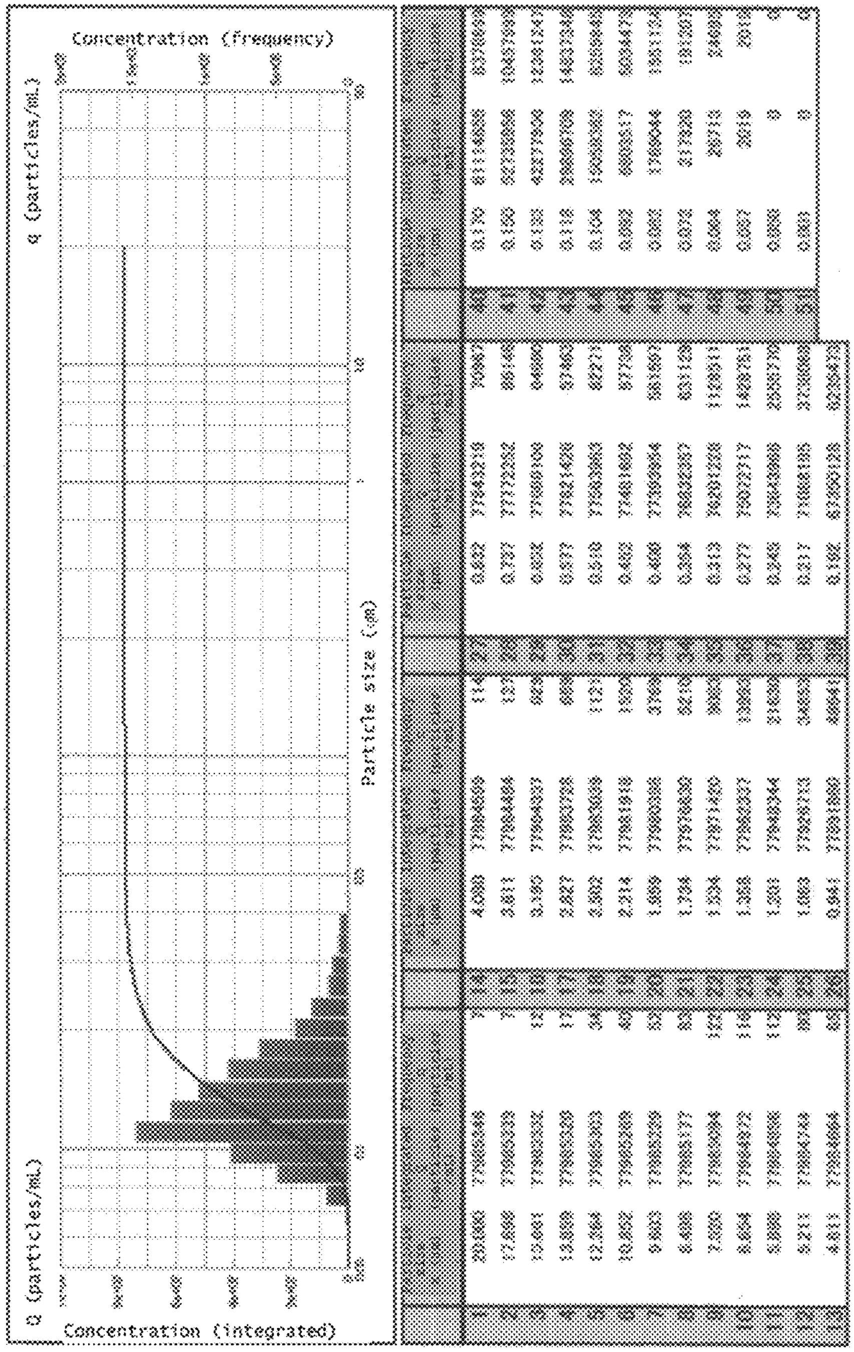
FIG. 8 is a chart illustrating measurement results of the generator of FIG. 7.

The results are illustrated in FIG. 8.

The average particle size was 136 nm, and the number of nano-order fine bubbles per ml was about 77 million.

Figure 9:
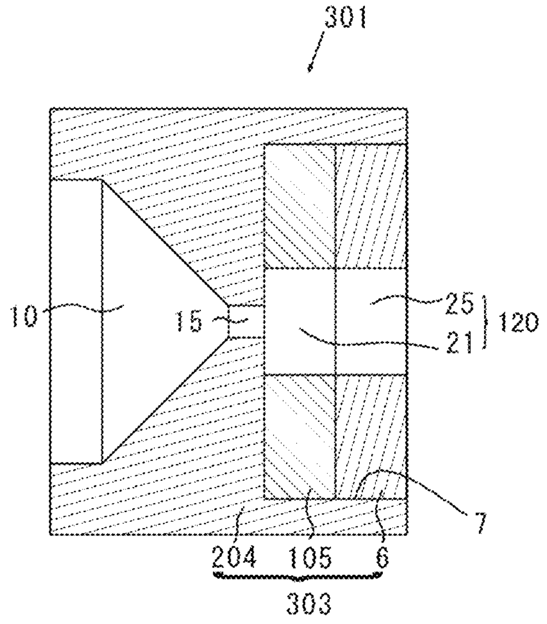
FIG. 9 is a cross-sectional view of a fine bubble generator according to another embodiment.

Next, the same test was performed on a sample in which the second concave portion was omitted in the specification of FIG. 7 (see FIG. 9).

Figure 10:
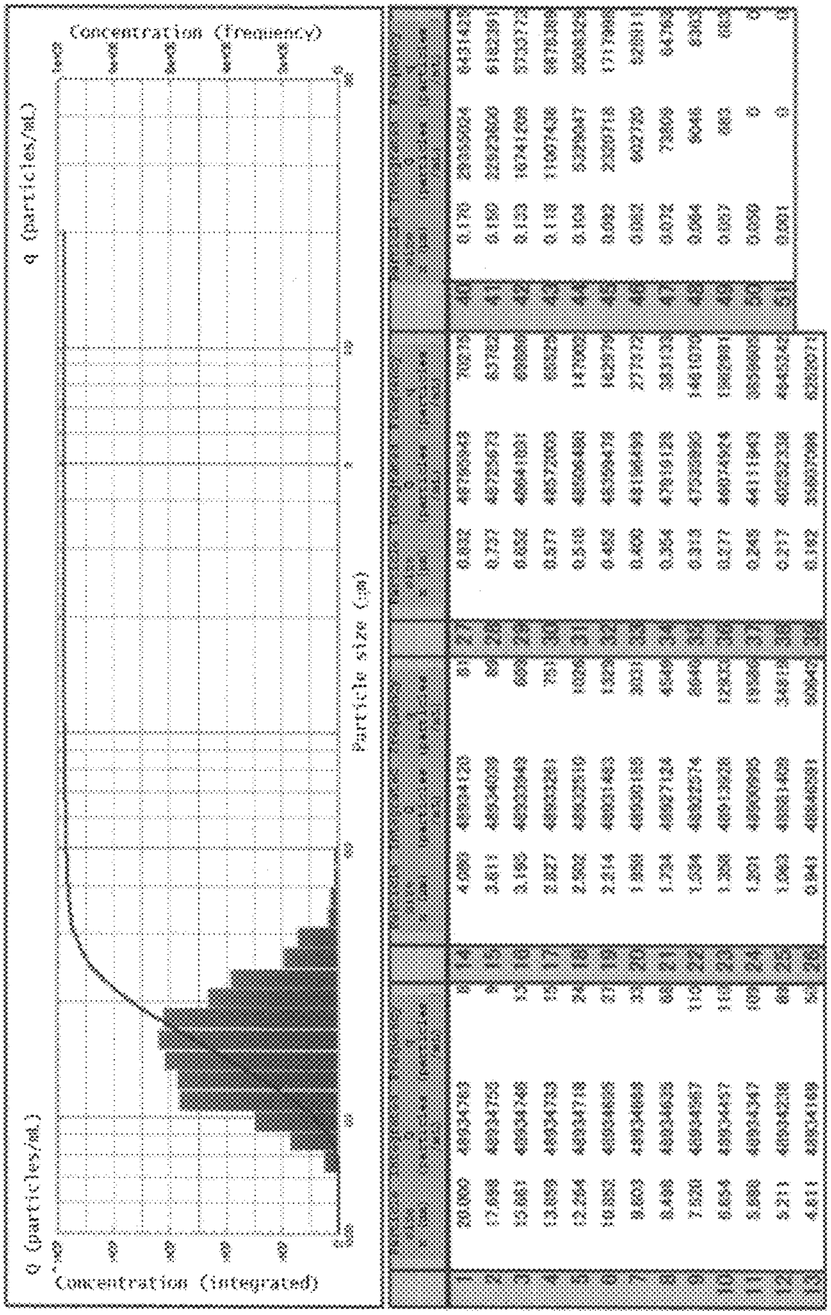
FIG. 10 is a chart illustrating measurement results of the generator of FIG. 9.

The results are illustrated in FIG. 10.

The average particle size was 158 nm, and the number of nano-order fine bubbles per ml was about 48 million.

From the above results, many nano-order fine bubbles were generated even in a case where the first concave portion or the second concave portion was omitted.

Figure 11:
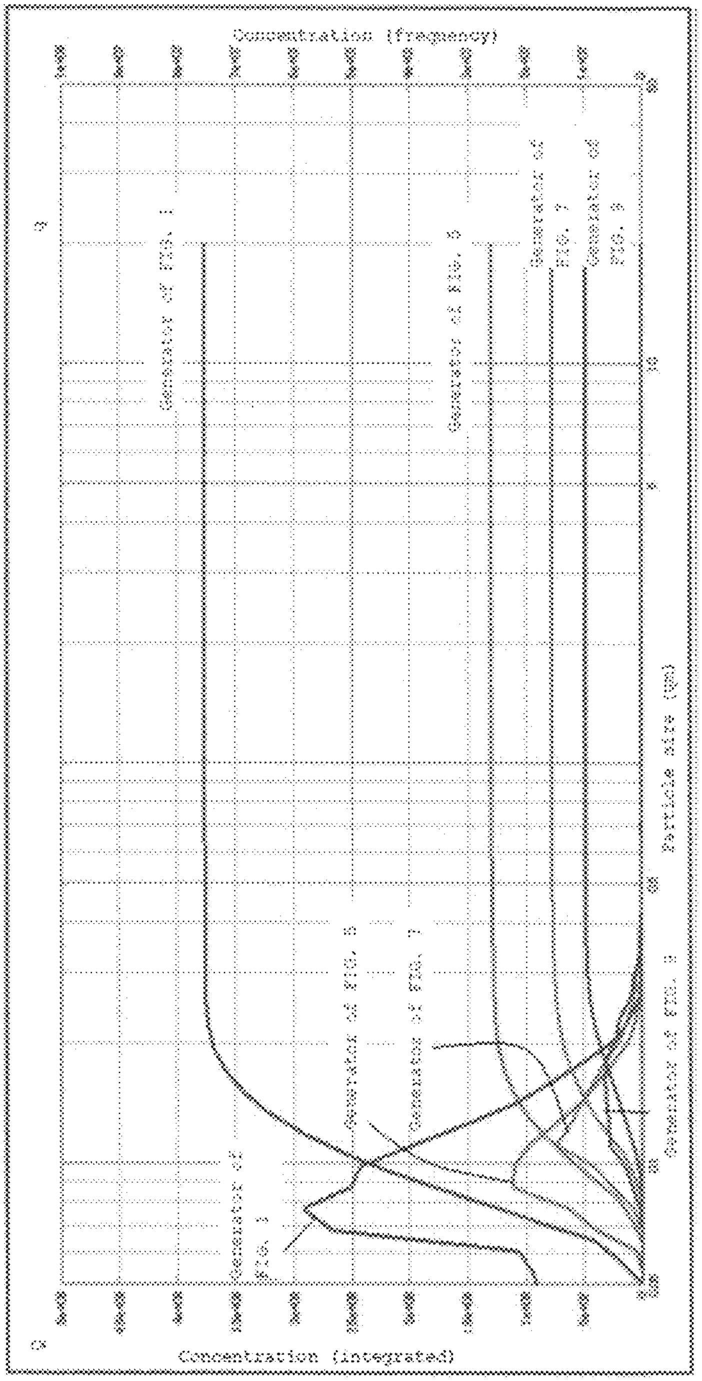
FIG. 11 is a chart summarizing the results of FIGS. 3, 6, 8, and 10 on the same scale.

FIG. 11 summarizes the results of FIGS. 3, 6, 8, and 10 on the same scale.

From the results of FIG. 11, it can be seen that providing the first concave portion and the second concave portion further reduces the particle size of the fine bubbles generated. It can be seen that the first concave portion and the second concave portion coexist, so that the particle size of the fine bubbles generated is remarkably reduced, and as a result, the number of fine bubbles generated is remarkably increased.

From the above, the present inventor has obtained the following finding.

A fine bubble generator including: an inlet portion that gradually reduces in diameter from an inlet of a tubular body; an orifice continuous to the inlet portion; and an enlarged-diameter portion continuous to the orifice, the inlet portion, the orifice and the enlarged-diameter portion being sequentially formed, wherein a boundary between the orifice and the enlarged-diameter portion is a radial elevation surface, a diameter of the enlarged-diameter portion is 3 to 10 times a diameter of the orifice, and the enlarged-diameter portion is released only at an outlet thereof.

In the above description, the boundary between the orifice and the enlarged-diameter portion corresponds to the outlet peripheral wall of the orifice. The outlet peripheral wall is preferably in a direction perpendicular to the axis of the orifice, but may have an inclination of ±20 degrees or ±10 degrees from the perpendicular. Here, the enlarged-diameter portion side is defined as "+" and the inlet portion side is defined as "−" about the outlet of the orifice.

When the inclination of the outlet peripheral wall exceeds +20 degrees, the bubbles formed due to the cavity effect are insufficiently stirred and mixed. On the other hand, when the inclination of the outlet peripheral wall exceeds −20 degrees, the water stream discharged from the orifice is drawn toward the inclined outlet peripheral wall side, so that a sufficient flow rate cannot be secured, and thus the pressure reduction becomes insufficient.

When the diameter of the enlarged-diameter portion is less than three times the diameter of the orifice, the pressure reduction becomes insufficient. On the other hand, when the diameter of the enlarged-diameter portion exceeds 10 times the diameter of the orifice, the water stream discharged from the outlet of the orifice is excessively dispersed to inhibit the water stream. Therefore, a sufficient flow rate cannot be secured, and the pressure reduction becomes insufficient.

The enlarged-diameter portion preferably has a uniform inner diameter as illustrated in the drawings, but may have an inverted funnel shape within the above range.

The enlarged-diameter portion is released only at its outlet. In other words, no air or other gas is injected from the outside into the peripheral wall of the enlarged-diameter portion. When the enlarged-diameter portion communicates with an external environment other than the outlet thereof, the reduced pressure environment in the enlarged-diameter portion may be disturbed, which is not preferable.

The second concave portion is formed at a position where the water stream discharged from the outlet of the orifice can be efficiently stirred. The second concave portion can be arbitrarily designed according to the flow rate, the diameter ratio between the orifice and the enlarged-diameter portion, the shape of the enlarged-diameter portion, and the like. According to the present inventors' study, it is preferable that the diameter of the second concave portion should be formed in a range of 0.5 to 1.5 times the diameter of the enlarged-diameter portion from the outlet of the orifice toward the downstream side in the axial direction of the orifice.

Hereinafter, the following matters will be disclosed.

(1)

A fine bubble generator including: an inlet portion that gradually reduces in diameter from an inlet of a tubular body; an orifice continuous to the inlet portion; and an enlarged-diameter portion continuous to the orifice, the inlet portion, the orifice and the enlarged-diameter portion being sequentially formed, wherein a radial elevation surface as a boundary between the orifice and the enlarged-diameter portion is formed with a first concave portion evenly distributed in a circumferential direction and a radial direction about a center of the orifice, and an inner peripheral surface of the enlarged-diameter portion is formed with a second concave portion or a convex portion continuous or intermittent in the circumferential direction.

(2)

A water treatment device including:

a water stream compression unit having a peripheral wall which uniformly compresses a water stream; and a water stream release unit formed downstream of the water stream compression unit and having a larger diameter than that of the water stream compression unit, wherein a first concave portion recessed in a direction opposite to the water stream is formed in the water stream release unit, and a pressure in the first concave portion is smaller than a pressure of the water stream released from the water stream compression unit to the water stream release unit.

(3)

The water treatment device according to (2), in which the pressure in the first concave portion is 1/10 to 1/100 of the pressure at a center of the water stream release unit.

(4)

The water treatment device according to (2), in which a second concave portion is formed in a circumferential direction on an inner peripheral surface of the water stream release unit, and a pressure in the second concave portion is larger than the pressure in the first concave portion and smaller than a pressure at the center of the water stream release unit.

(5)

The water treatment device according to (2), in which a concave portion continuous or intermittent in the circumferential direction or a convex portion continuous or intermittent in the circumferential direction is formed in the inner peripheral surface of the water stream release unit, and stirs the water stream released from the water stream compression unit.

(6)

The water treatment device according to any one of claims (2) to (5), further including a device that removes fine bubbles from the water stream released from the water stream release unit.

The present invention is not limited to the description of the embodiments of the invention. Various modifications are also included in the present invention as long as those skilled in the art can easily conceive them without departing from the recitation of the claims.

DESCRIPTION OF REFERENCE NUMERALS

1, 101, 201, 301 Fine bubble generator
8 Peripheral wall of outlet of orifice
10 Inlet portion
15 Orifice
20 Enlarged-diameter portion
23 Second concave portion
40 First concave portion

The invention claimed is:

1. A fine bubble generator comprising:

a tubular body having an internal flow path including an inlet portion, an orifice and an enlarged-diameter portion, with the inlet portion, the orifice and the enlarged-diameter portion being sequentially formed, wherein the inlet portion gradually reduces in diameter from an inlet of the tubular body, the orifice is continuous to the inlet portion, the enlarged-diameter portion is continuous to the orifice and larger in diameter than the orifice, an outlet peripheral wall of the orifice is a radial elevation surface, the enlarged-diameter portion has a single inlet which is only in fluid communication with the orifice, the enlarged-diameter portion is not open to an outer circumference of the tubular body such that no air is introduced from outside into the enlarged-diameter portion via a peripheral wall of the enlarged-diameter portion, the enlarged-diameter portion is opened only at an outlet on an extension of a center line of the orifice, a plurality of concave portions are formed in the outlet peripheral wall spaced apart from one another, the plurality of concave portions are fluidly unconnected to an outer circumference of the tubular body, and only in direct fluid communication with the enlarged-diameter portion, the orifice is an axial opening without slits extending radially therefrom, and all water from the inlet portion is funneled toward a center of the orifice and passes therethrough to reach the enlarged-diameter portion.

2. The fine bubble generator according to claim 1, wherein a second concave portion or a convex portion continuous or intermittent in a circumferential direction is formed in an inner peripheral surface of the enlarged-diameter portion.

3. The fine bubble generator according to claim 1, wherein the outlet peripheral wall is formed in a direction perpendicular (±20 degrees) to an axis of the orifice.

4. The fine bubble generator according to claim 1, wherein the plurality of concave portions are evenly distributed in a circumferential direction and a radial direction about the center of the orifice in the outlet peripheral wall of the orifice.

5. The fine bubble generator according to claim 1, wherein a diameter of the enlarged-diameter portion is 3 to 10 times a diameter of the orifice.

6. The fine bubble generator of claim 1, wherein, at the outlet peripheral wall, openings of the plurality of concave portions are shaped as rectangles with rounded corners.

7. The fine bubble generator of claim 1, wherein the plurality of concave portions are constant in diameter or reduce in diameter in a depth direction extending into the outlet peripheral wall.

8. The fine bubble generator of claim 1, wherein the plurality of concave portions are provided as four concave portions evenly distributed in a circumferential direction at intervals of 90° about the center of the orifice.

9. A water treatment device comprising:

the fine bubble generator according to claim 1; and a water supply unit that supplies water to the fine bubble generator.

10. The water treatment device according to claim 9, further comprising a fine bubble remover that removes the fine bubbles generated by the fine bubble generator.

11. A water treatment method comprising steps of:

preparing the fine bubble generator according to claim 1; and supplying water to the inlet portion.

12. The water treatment method according to claim 11, wherein fine bubbles contained in water discharged from an outlet side of the orifice are removed.

13. A method for manufacturing fine bubble water, comprising steps of:

preparing water; and treating the water with the fine bubble generator according to claim 1.

14. A method for manufacturing water, comprising steps of:

preparing the fine bubble water manufactured according to claim 13; and removing some or all of fine bubbles from the fine bubble water.

* * * * *